United States Patent
Wang et al.

(10) Patent No.: US 11,693,141 B2
(45) Date of Patent: Jul. 4, 2023

(54) METHODS AND SYSTEMS FOR PROCESSING BOREHOLE DISPERSIVE WAVES WITH A PHYSICS-BASED MACHINE LEARNING ANALYSIS

(71) Applicant: HALLIBURTON ENERGY SERVICES, INC., Houston, TX (US)

(72) Inventors: Ruijia Wang, Singapore (SG); John Granville, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 170 days.

(21) Appl. No.: 16/606,690

(22) PCT Filed: Dec. 6, 2018

(86) PCT No.: PCT/US2018/064171
§ 371 (c)(1),
(2) Date: Oct. 18, 2019

(87) PCT Pub. No.: WO2020/117235
PCT Pub. Date: Jun. 11, 2020

(65) Prior Publication Data
US 2021/0333428 A1 Oct. 28, 2021

(51) Int. Cl.
*G01V 1/50* (2006.01)
*G01V 1/28* (2006.01)
(Continued)

(52) U.S. Cl.
CPC ............... *G01V 1/50* (2013.01); *G01V 1/282* (2013.01); *G01V 1/345* (2013.01); *G06N 20/00* (2019.01);
(Continued)

(58) Field of Classification Search
CPC .......... G01V 1/50; G01V 1/282; G01V 1/345; G01V 2210/30; G01V 2210/47; G01V 2210/66; G01V 2210/74; G06N 20/00
See application file for complete search history.

(56) References Cited

U.S. PATENT DOCUMENTS

| 5,278,805 A | 1/1994 | Kimball |
| 7,120,541 B2* | 10/2006 | Wang ................. G01V 1/48 |
| | | 702/11 |

(Continued)

FOREIGN PATENT DOCUMENTS

| WO | 2018080450 A1 | 5/2018 |
| WO | 2018087648 A2 | 5/2018 |
| WO | 2018106279 A1 | 6/2018 |

OTHER PUBLICATIONS

International Search Report and Written Opinion; PCT Application No. PCT/US2018/064171; dated Aug. 26, 2019.

*Primary Examiner* — Alexander Satanovsky
*Assistant Examiner* — Lynda Dinh
(74) *Attorney, Agent, or Firm* — Polsinelli PC

(57) ABSTRACT

Systems and methods are provided for determining a formation body wave slowness from an acoustic wave. Waveform data is determined by logging tool measuring the acoustic wave. Wave features are determined from the waveform data and a model is applied to the wave features to determine data-driven scale factors The data-driven scale factors can be used to determine a body wave slowness within a surrounding borehole environment and the body wave slowness can be used to determine formation characteristics of the borehole environment.

16 Claims, 9 Drawing Sheets

(51) Int. Cl.
*G01V 1/34* (2006.01)
*G06N 20/00* (2019.01)
(52) U.S. Cl.
CPC ...... *G01V 2210/30* (2013.01); *G01V 2210/47* (2013.01); *G01V 2210/66* (2013.01); *G01V 2210/74* (2013.01)

(56) References Cited

U.S. PATENT DOCUMENTS

| | | | |
|---|---|---|---|
| 7,643,374 B2* | 1/2010 | Plona | G01V 1/50 367/68 |
| 7,660,196 B2* | 2/2010 | Saiki | G01V 1/36 367/31 |
| 7,698,066 B2 | 4/2010 | Huang et al. | |
| 7,764,572 B2* | 7/2010 | Wu | G01V 1/44 367/31 |
| 8,456,952 B2* | 6/2013 | Tang | G01V 1/30 367/49 |
| 2013/0054201 A1 | 2/2013 | Posamentier et al. | |
| 2015/0049585 A1* | 2/2015 | Collins | G01V 1/50 367/35 |
| 2018/0335538 A1* | 11/2018 | Dupont | G06Q 50/02 |

* cited by examiner

METHODS AND SYSTEMS FOR PROCESSING BOREHOLE DISPERSIVE WAVES WITH A PHYSICS-BASED MACHINE LEARNING ANALYSIS

CROSS-REFERENCE TO RELATED APPLICATIONS

This application is a national stage entry of PCT/US2018/064171 filed Dec. 6, 2018, said application is expressly incorporated herein in its entirety.

TECHNICAL FIELD

The present technology pertains to the processing of acoustic logging information, and more specifically to hybrid model-driven and data-driven acoustic logging information processing for dispersive acoustic waves in a complex borehole environment.

BACKGROUND

Various acoustic properties of a borehole are logged and processed in order to monitor and predict wellbore and formation characteristics throughout drilling. Generally, acoustic properties, such as borehole dispersion waves, are processed in order to extract other properties related to the borehole. For example, a body wave slowness can be extracted from borehole dispersion waves in order to gain insight into material and geometric properties of the borehole. Often, either a model-based processing will be used to extract body wave slowness from the dispersion waves or, alternatively, a data-driven processing will be used to achieve the same.

Where model-based processing is used, a smooth slowness curve can be generated even though data quality may be very poor (e.g., from logging tools, formation sampling tools, and other monitors within the borehole itself). However, the curve may be strongly biased due to various factors (e.g., anisotropy, irregular borehole shape, unaccounted for borehole alteration, and the like). Where data-driven processing is used, accurate values can be generated from high quality data but the slowness curve will become very inaccurate as data quality goes down. As a result, lower quality sensor system or high quality sensors in complex environments may cause variable consistency in quality of curves produced by solely model-based or data-driven approaches.

BRIEF DESCRIPTION OF THE DRAWINGS

The embodiments herein may be better understood by referring to the following description in conjunction with the accompanying drawings in which like reference numerals indicate analogous, identical, or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This disclosure provides techniques for an adaptive processing of borehole related information. Modeling-based inversion, data-driven schemes, or data-driven inversion with model constraints are typically used to estimate low and/or high frequency asymptotes of dispersion curves for dispersive sonic waves (e.g., leaky-P waves, flexural waves, screw waves, pseudo-Raleigh waves, and the like). Modeling-based approaches may run into difficulties due to complexities of a borehole environment making it difficult to accurately control all modeling parameters.

Data-driven approaches may produce more reliable slowness curves and the like in comparison to the model-driven approaches, but only when acoustic dispersion curves are reliable, fully developed, and well defined. As a result, model-driven approaches may provide more accurate outputs when all modeling parameters are known, regardless of data quality such as a lack of low and/or high frequency asymptotes of a dispersion curve.

In effect, accurate real-time processing for producing slowness curves under variable and uncertain borehole conditions can be improved by automatically determining and alternating between model-based and data-driven processing of borehole data. All borehole related data may be used and a quality of the data may be assessed by a supervised, physics-based machine learning analysis.

Figure 1:
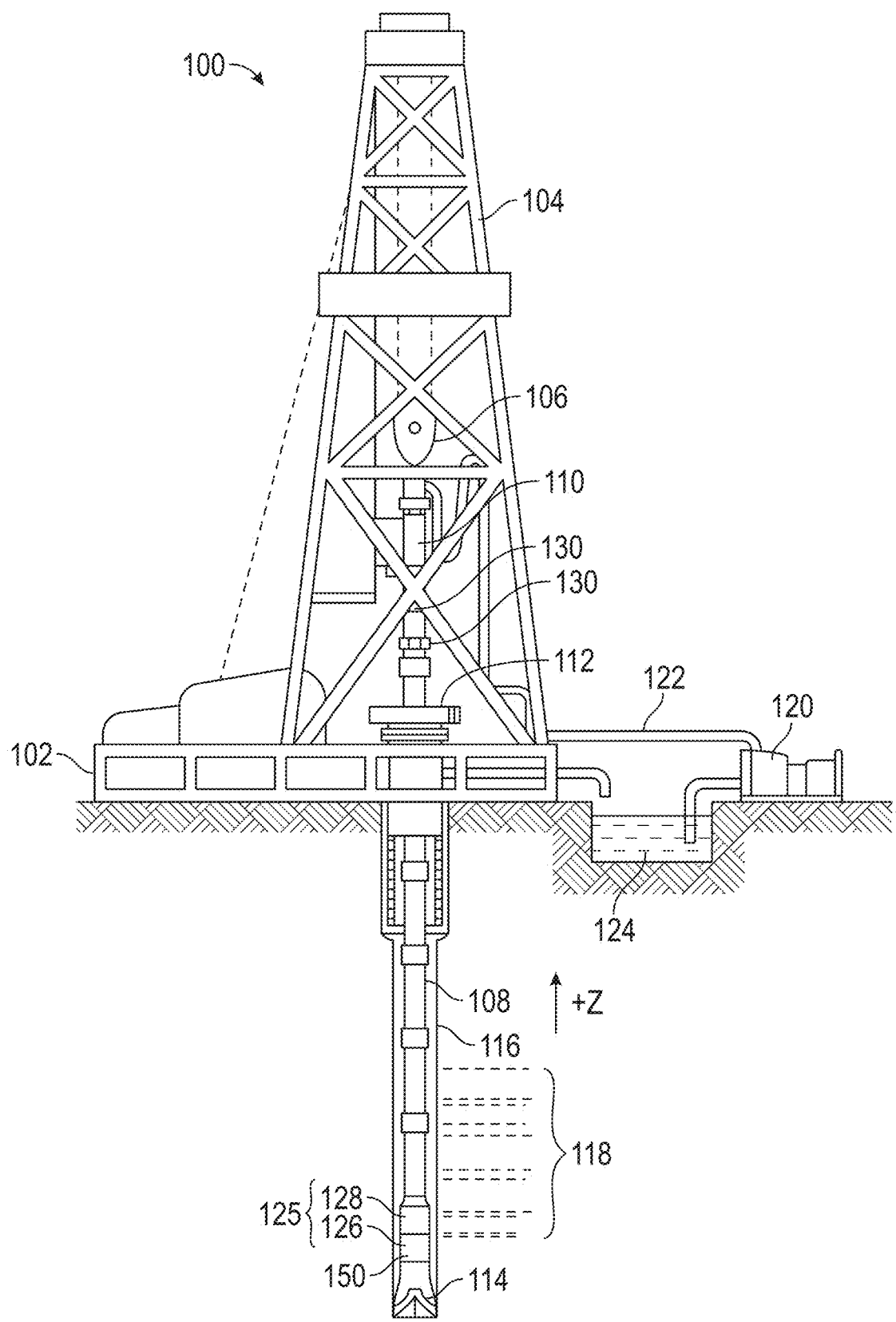
FIG. 1 is a schematic diagram of an example logging-while-drilling (LWD) environment, according to various embodiments of the subject technology.

FIG. 1 illustrates a diagrammatic view of an exemplary logging while drilling (LWD) and/or measurement while drilling (MWD) borehole operating environment 100 in which the present disclosure can be implemented. A drilling platform 102 is equipped with a derrick 104 that supports a hoist 106 for raising and lowering a drill string 108. The hoist 106 suspends a top drive 110 suitable for rotating the drill string 108 and lowering the drilling string 108 through the well 112. Connected to the lower end of the drill string 108 is a drill bit 114 which creates a borehole 116 by rotating and passing through various geological formations 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the borehole 116 into the pit 124 and aids in maintaining the integrity of the borehole 116. Various materials can be used for drilling fluid, including oil-based fluids and water-based fluids.

Logging tools 126 can be integrated into a bottom-hole assembly 125 near the drill bit 114. As the drill bit 114 extends the borehole 116 through the formations 118, logging tools 126 collect measurements relating to various formation properties as well as tool and/or other drilling conditions. The bottom-hole assembly 125 can also include a telemetry sub 128 to transfer measurement data to a surface receiver 130 and to receive commands from the surface. In some embodiments, the telemetry sub 128 does not communicate with the surface, but rather stores logging data for later retrieval at the surface when the logging assembly is recovered.

Each of the logging tools 126 can include multiple tool components, spaced apart from each other, and communicatively coupled with one or more wires. Logging tools 126 can include, for example, sonic receivers and/or emitters for performing acoustic measurements of the borehole 116. The telemetry sub 128 can include wireless telemetry or wired communications, or both, such as to transmit or later provide information indicative of received acoustic energy/waveforms to operators on the surface or for later access and data processing for the evaluation of formation 118 properties.

The logging tools 126, including the acoustic logging tool, may also include one or more computing devices 150 communicatively coupled with one or more of the plurality of tool components. The computing device 150 may be configured to control or monitor the performance of the tools 126, process logging data, and/or carry out the methods of the present disclosure.

In some embodiments, one or more of the logging tools 126 may communicate with a surface receiver 130, such as wired drillpipe. In other cases, the one or more of the logging tools 126 can communicate with a surface receiver 130 by wireless signal transmission. In at least some cases, one or more of the logging tools 126 may receive electrical power from a wire that extends to the surface, including wires extending through a wired drillpipe. In at least some instances the methods and techniques of the present disclosure may be performed by a computing device (not shown) located on the surface. In some embodiments, the computing device may be included in the surface receiver 130. For example, surface receiver 130 of the wellbore operating environment 100 at the surface may include one or more of wireless telemetry, processor circuitry, or memory facilities, such as to support substantially real-time processing of data received from one or more of the logging tools 126. In some embodiments, data is processed at some time subsequent to its collection, wherein the data may be stored on the surface at surface receiver 130, stored downhole in telemetry sub 128 or both, until it is retrieved for processing. In some examples, the stored data may be retrieved for determining drilling parameter adjustments and the like. For example, and without imputing limitation, an optimal drilling speed may be determined based on retrieved formation characteristics stored in surface receiver 130 or telemetry sub 128.

Figure 2:
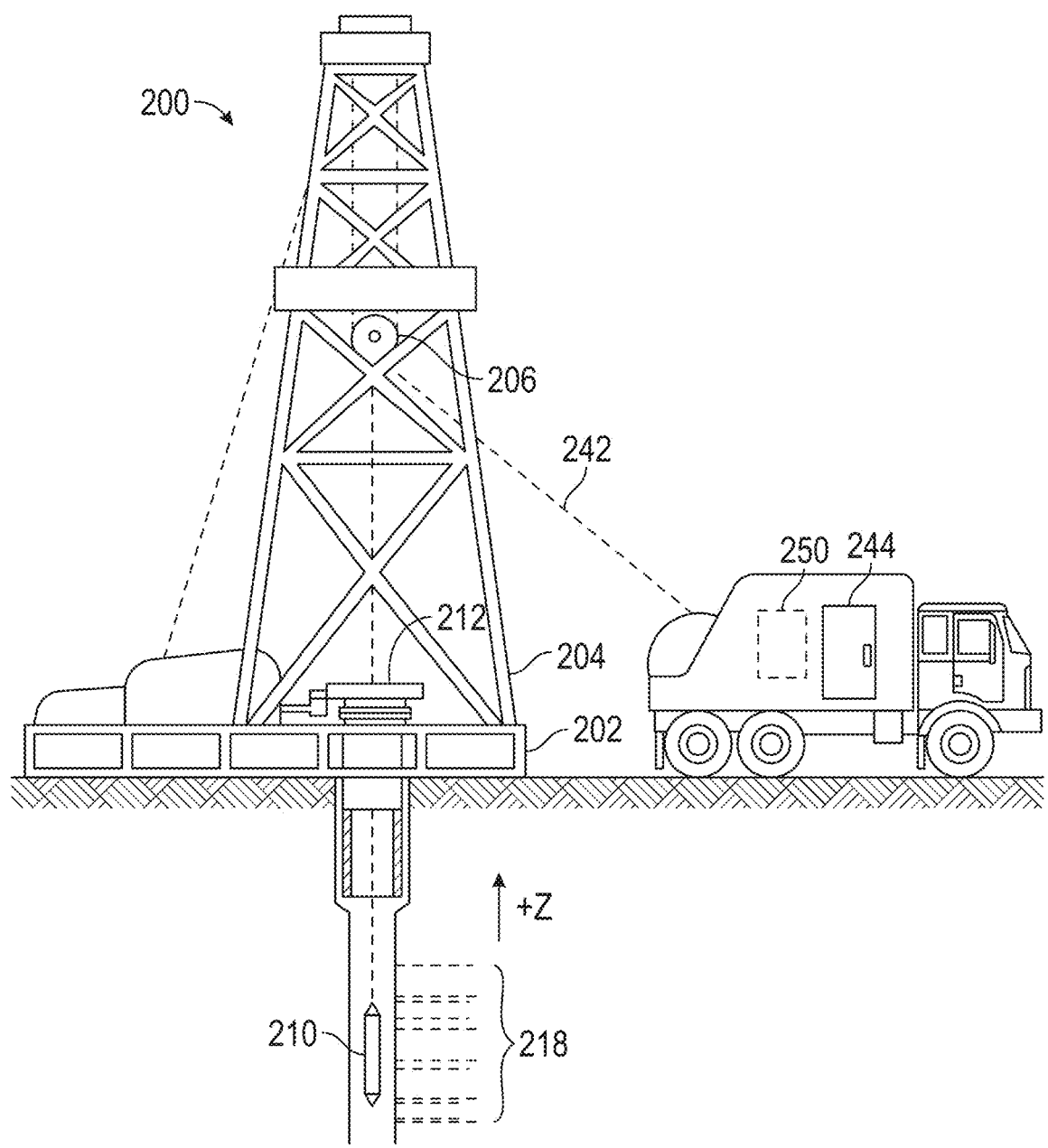
FIG. 2 is a schematic diagram of an example conveyance logging environment, according to various embodiments of the subject technology.

FIG. 2 illustrates a diagrammatic view of a conveyance logging (WL) borehole operating environment 200 (also referred to as "wireline" in the field) in which the present disclosure can be implemented. A hoist 206 can be included as a portion of a platform 202 which is coupled to a derrick 204. The hoist 206 may be used to raise or lower equipment such as acoustic logging tool 210 into or out of a borehole. Acoustic logging tool 210 can include, for example, sonic receivers and/or emitters for performing acoustic measurements of the borehole. A conveyance 242 provides a communicative coupling between the acoustic logging tool 210 and a logging facility 244 at the surface. The conveyance 242 may include wires (one or more wires), slicklines, cables, or the like, as well as tubular conveyances such as coiled tubing, joint tubing, or other tubulars, and may include a downhole tractor. Additionally, power can be supplied via the conveyance 242 to meet power requirements of the tool. The acoustic logging tool 210 may have a local power supply, such as batteries, downhole generator and the like. When employing non-conductive cable, coiled tubing, pipe string, or downhole tractor, communication may be supported using, for example, wireless protocols (e.g., EM, acoustic, etc.), and/or measurements and logging data can be stored in local memory for subsequent retrieval. The logging facility 244 may include a computing device 250 able to carry out the methods and techniques of the present disclosure. Data regarding a formation 218 can be obtained by acoustic logging tool 210 and processed by computing device 250. In some embodiments, computing device 250 may be equipped to process received information in substantially real-time. In some embodiments, computing device 250 may store the received information for later retrieval and processing, either on-site or elsewhere.

Figure 3:
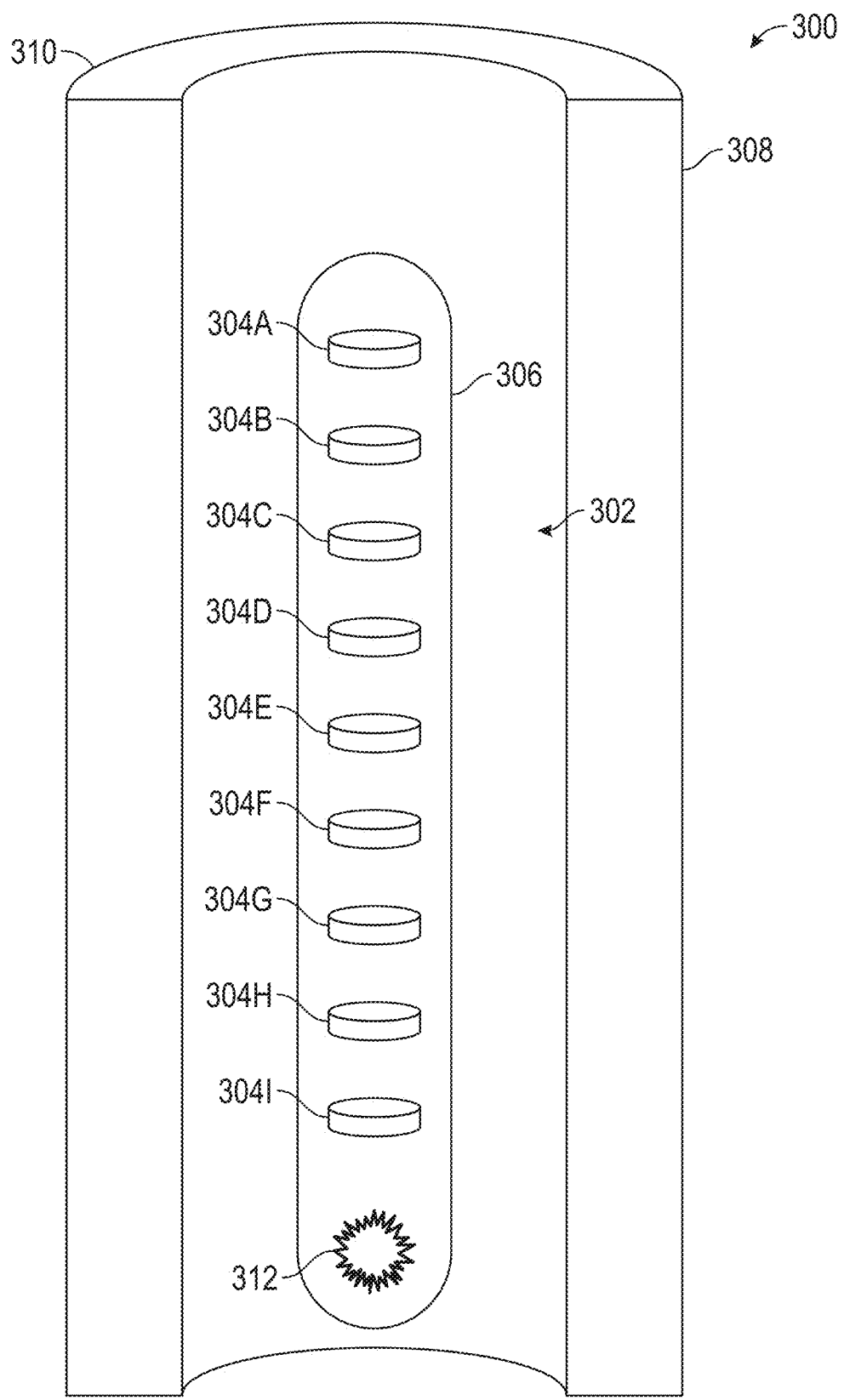
FIG. 3 is a diagrammatic view of an fluid-filled borehole model, according to various embodiments of the subject technology.

FIG. 3 illustrates a diagrammatic view of a borehole operating environment model 300 which may be used by the methods of the present disclosure. The borehole operating environment model 300 includes a fluid-filled borehole 302 which extends down from a surface 310 and may be filled with mud, drilling fluid, and other fluid materials. A sonic logging tool 306 is included within the fluid-filled borehole 302 and can be a WL sonic logging tool or an LWD sonic logging tool. A formation 308 is further included in the borehole operating environment model 300 and surrounds the fluid-filled borehole 302.

The sonic logging tool 306 can measure refracted and guided waves propagating along sidewalls of the fluid-filled borehole 302. Acoustic properties of the formation 308 can then be extracted (e.g., derived) from the measured waves. More particularly, the sonic logging tool 306 includes an acoustic emitter 312 which can excite acoustic waves for a set of receivers 304A-I to receive at various locations along the sonic logging tool 306. Further, data regarding the fluid-filled borehole 302 and surrounding formation 308 can be determined by various characteristics of a wave propagation detected by each receiver 304A-I receiving the wave in sequence. For example, a time delay between receiver 304I receiving a particular waveform and receiver 304H receiving the same particular waveform may be used to determine various characteristics of the medium through which the wave propagated (e.g., the fluid-filled borehole 302 or formation 308).

The sonic logging tool can excite and capture borehole guided waves such as, for example and without imputing limitation, flexural waves for WL logging, screw waves for LWD logging, and leaky-P waves for a soft formation. The captured borehole guided waves can then be used to measure acoustic properties of the formation 308, such as formation body compressional slowness and body shear wave slowness.

Oftentimes, the borehole guided waves may be dispersive and thus include low-frequency asymptotes approaching the formation body slowness. However, low-frequency asymptote signals may have a poor signal to noise ratio (SNR) due to a low excitation amplitude (e.g., the signal may be drowned out by other frequencies). As a result, additional processing may convert the wave dispersion measurements to formation body wave slowness values. A modeling-based approach may be used and assumes as known all model parameters except for target slowness. The modeling-based approach may then invert the target slowness by decreasing a misfit between modeling results and measurements. As a result, a smooth log can be generated, which may be biased due to uncontrolled or inaccurately controlled model inputs.

In comparison, a data-driven approach may instead be used to produce slowness values. The data-driven approach may avoid reliance on modeling parameters by processing data without use of generated models. However, the data-driven approach requires a minimum quality of data to drive processing or else noise in the data can dominate and bias the processed results.

Figure 4A:
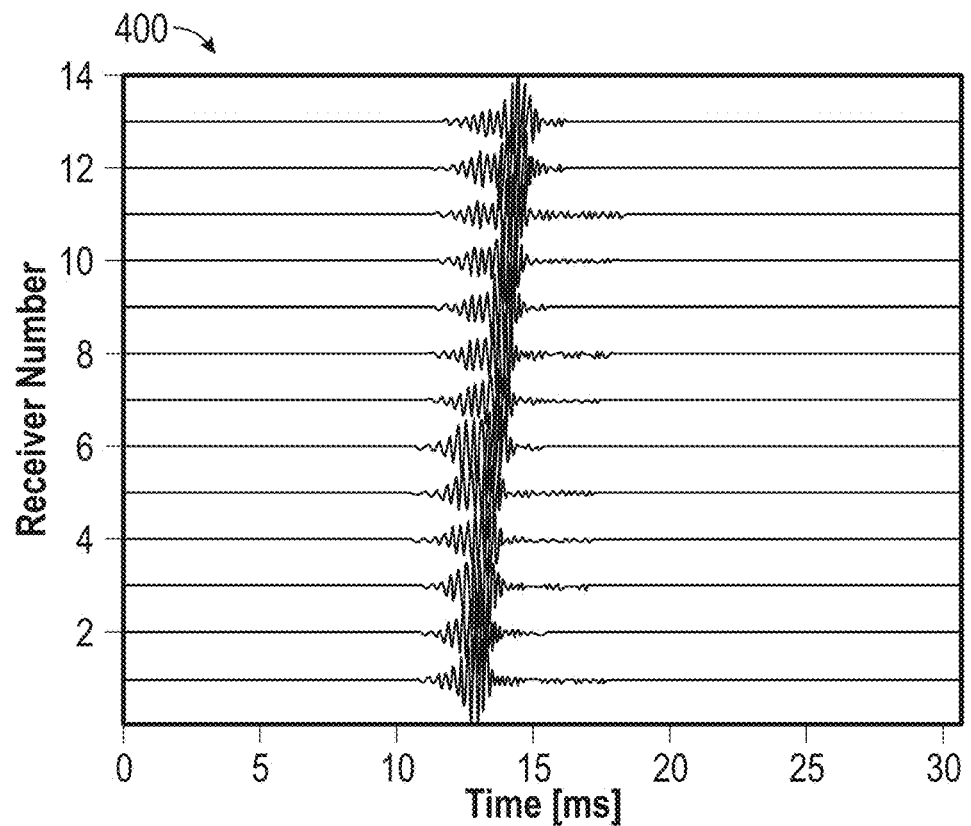
FIG. 4A is a graph of an example waveform, according to various embodiments of the subject technology.
Figure 4B:
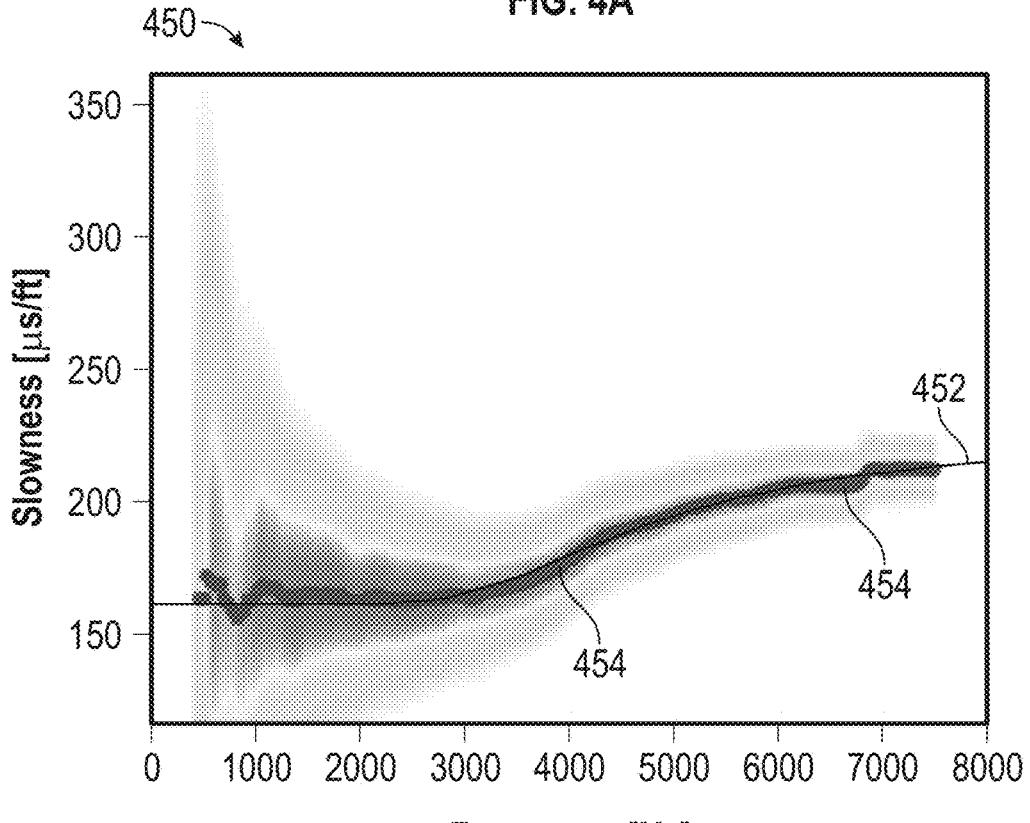
FIG. 4B is a graph of an example dispersion curve, according to various embodiments of the subject technology.

FIG. 4A and FIG. 4B show a waveform graph 400 of a dispersive flexural wave and a scatterplot 450 of a dispersion measurement and modeling result corresponding to a measured dispersion, respectively. In WL logging, for example, a dipole source (e.g., acoustic emitter 312) may be used to excite flexural waves for measuring formation body shear slowness. The flexural waves may be modeled and measured as depicted in the waveform graph 400 and the scatterplot 450.

The scatterplot 450 shows a well-developed dispersion curve 452 which provides a stable, reliable, and observable low frequency asymptote. The curve is generated from plotted measurements 454 and reflects an ideal data quality from which data-driven approaches may produce reliable estimates of formation slowness. The waveform graph 400 provides a timing for each of multiple receivers (e.g., receivers 304A-I) for receiving an acoustic waveform (here, a dispersive flexural wave).

Figure 5A:
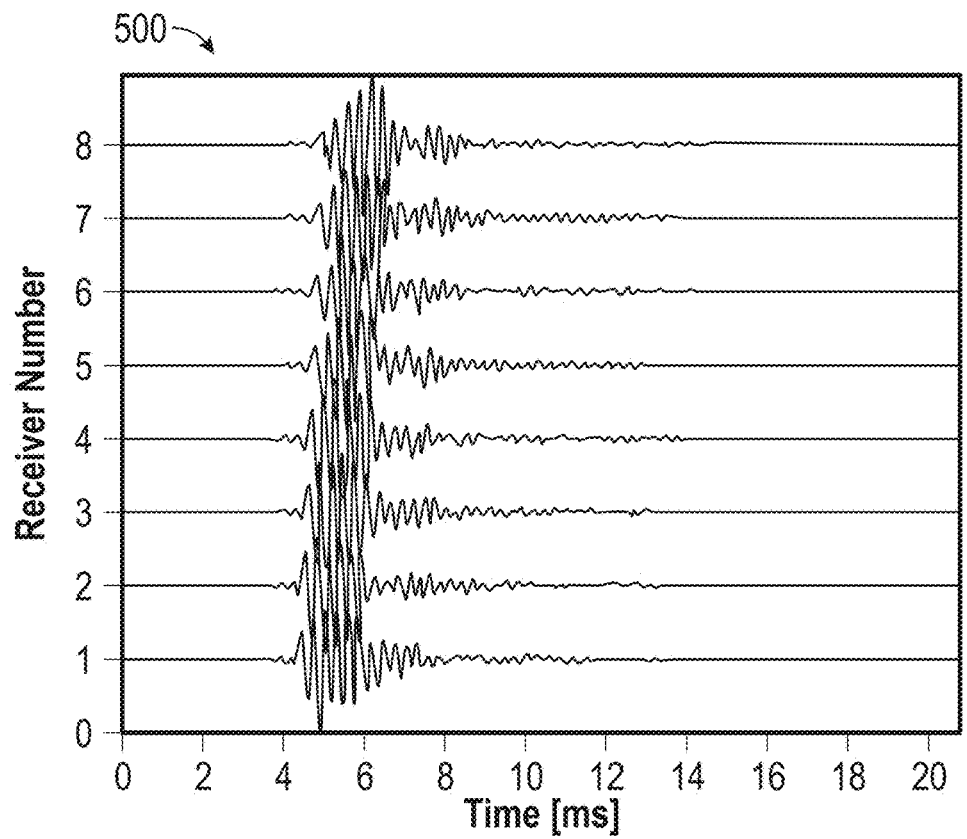
FIG. 5A is a graph of an example waveform, according to various embodiments of the subject technology.
Figure 5B:
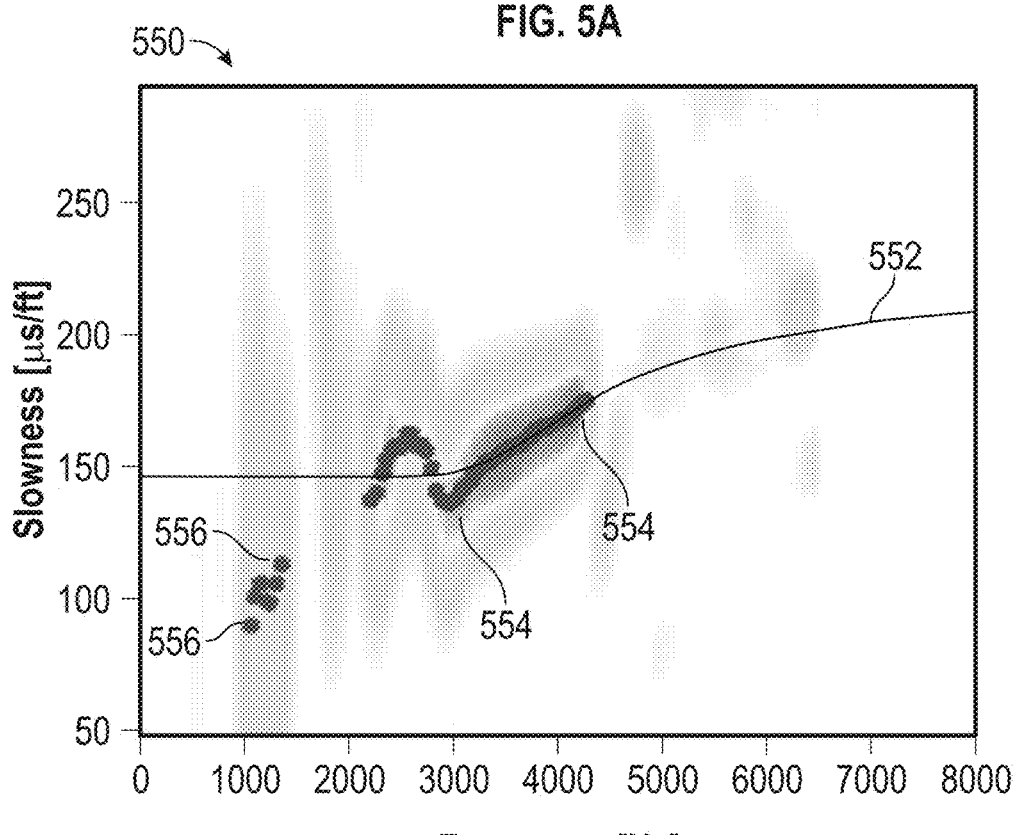
FIG. 5B is a graph of an example dispersion curve, according to various embodiments of the subject technology.

In comparison, FIG. 5A and FIG. 5B also show a waveform graph 500 of a dispersive flexural wave and a scatterplot 550 of a dispersion measurement and modeling result corresponding to a measured dispersion, respectively. As depicted in FIG. 5A and FIG. 5B, a data-driven approach produces an inaccurate slowness prediction when provided with low quality data.

As can be seen on the waveform graph 500, each receiver may receive a differently altered waveform from each other. For example, receiver 1 and receiver 2 exhibit distinctly featured waveforms. As a result, dispersion measurements of scatterplot 550 may be absent along certain frequencies or, as with measurements 556, diverge considerably from a dispersion curve 552. Further, measurements 554 may diverge only slightly, though consistently, from the dispersion curve 552. In other words, messy or noisy waveform data can result in a dispersion curve with low accuracy as it will be biased towards divergent measurements due to curve fitting.

Figure 6:
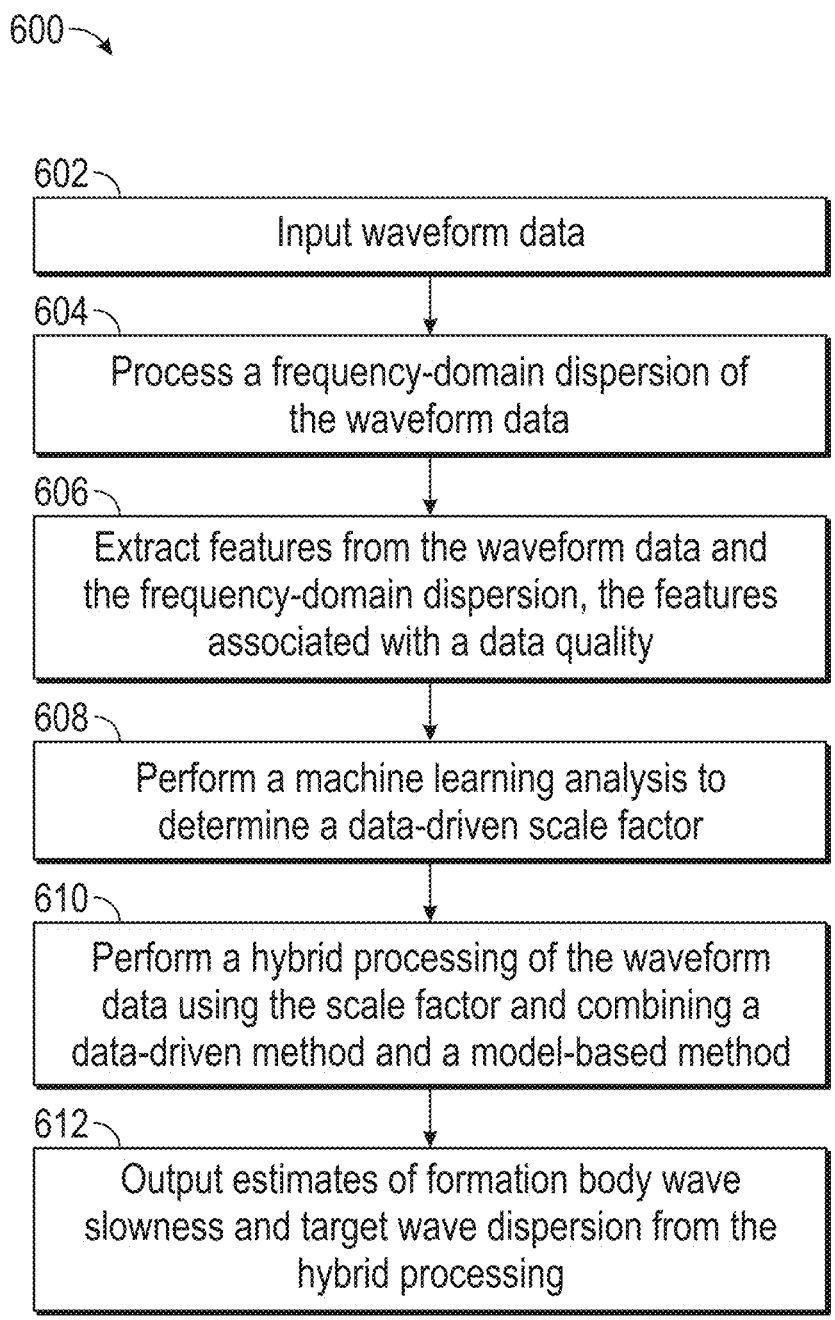
FIG. 6 is a method flowchart for data quality control, determining data-driven scale factors and performing hybrid processing, according to various embodiments of the subject technology.

A quality control can be applied to the dispersion curve where the data producing the measurements underpinning the dispersion curve is noisy or of poor quality (as discussed above) in order to provide a useful determination of, for example, formation slowness and the like. The quality control can derive scaling factors that act adaptively to control the lean of a fitting process to rely more or less on the dispersion curve from data or from a generated model. As a result, hybrid processing can be applied to the waveform data and based on the derived scaling factors. FIG. 6 depicts one such method for performing the hybrid processing.

As depicted in FIG. 6, a workflow 600 incorporates an adaptive determination of dispersion processing methodology. Waveform data is first received as input (operation 602). A frequency domain dispersion of the waveform data can then be processed in order to extract dispersion curves from the waveform data (operation 604). In some embodiments, the waveform data can be preprocessed before undergoing semblance processing, such as filtering, to remove unnecessary signals.

Features associated with data quality may then be extracted from the waveform data and the frequency-domain dispersion (operation 606). The extracted features can include, for example and without imputing limitation, semblance values, effective dispersion length in frequency, minimum effective frequency, SNR of the data at different frequencies, compressional slowness, borehole radius, and other information from modeling processes. For example, a semblance value may be directly calculated from frequency analysis maps (e.g., background values of FIG. 4B and FIG. 5B discussed above) and an effective dispersion curve length may be based on the semblance value and information from the modeling processes. The effective dispersion curve length, $l_{val}$, can be calculated by:

$$l_{val} = \text{count}(S_{val}) * df \quad (1)$$

$$S_{val}(f) = S_{mear}(f) \text{ Semb}(f) > 0 \& |S_{mear}(f) - S_{model}(f)| S_{thr} \quad (2)$$

The minimum effective frequency, $f_{min}$, of the data may be calculated by, $$f_{min} = \min f_{val} \quad (3)$$

Furthermore, the SNR of the data can be calculated using the amplitude and noise of the waveform data. The amplitude might be estimated in a frequency domain by a beamforming approach, while noise can be computed from the waveform data prior to the first arrival of any received signals. High frequency monopole data can be processed to determine compressional slowness and radius data can be provided via a caliper tool and the like. A cut-off frequency can also be derived from modeling data and utilized for validating data according to whether the data reaches the cut-off frequency. The cut-off frequency may be a frequency of a dispersion curve where body wave slowness is almost equal to formation body wave slowness.

In some cases, only some of the above features may be able to be derived or extracted from the waveform data and the frequency-domain dispersion. Nevertheless, workflow 600 can successfully produce formation body wave slowness values and target wave dispersion values without one or more of the features discussed above. Scale factors can be determined based on the determined features and/or data from other sensors or tools. In one example, an empirical equation can be used to determine the scale factors for hybrid dispersion processing. For example, the equation might include a function receiving semblance values, dispersion curve length, minimum effective frequency, SNR, DTC (e.g., a measure of formation compressional slowness), radius data, and a cut-off frequency. In some examples, the empirical equation may be in the form of:

$$\text{Sca}=F(\text{Semb}, l_{val}, f_{min}, \text{SNR}, \text{DTC}, r, f_{cut\text{-}off}) \qquad (4)$$

In some embodiments, a machine learning analysis can receive the extracted features and determine a library or mapping function for producing data-driven scale factors (operation 608). For example, the practitioner might utilize unsupervised pre-trained networks or convolutional neural networks to determining the data-driven factors. The data-driven scale factors can be utilized for balancing data-driven and model-based approaches in processing data. For example, if a scale factor, Sca, is equal to 1 (e.g., Sca=1), then data processing may be entirely data-driven (as compared to model-based). In comparison, where Sca=0, processing can be entirely model-based with all data-driven parameters fixed at an initial value and not adjusted to, for example, account for error generated by unknown parameters. Where Sca is valued between 0 and 1, a limited data-driven processing may be performed and the data-driven parameters may be restricted in a range determined from the scale factor (e.g., Sca). In other words, the utilization of data-driven parameters can be bounded according to the one or more scale factors. While the above discussion describes a single scale factor, it is understood that multiple data-driven scale factors can be generated to control processing and may each be associated with various features.

A hybrid processing of the waveform data can then be performed using the scale factor and combining a data-driven and model-based approach as described above (operation 610). For example, a hybrid dispersion processing might include the equation:

$$O(S_{shear}, a, b) = \Sigma_f |S_{modeling}(S_{shear}, a, b, f) - S_{meas}(f)|^2 \qquad (5)$$

where O is an objective function and a and b are adjustable model parameters in order to let data drive processing to determine low frequency asymptotes. The shear slowness, $S_{shear}$, and parameters, a and b, minimize the objective function and may be optimized.

To perform a hybrid processing, a sweeping range for a and b can be restricted with the equations:

$$\text{Sca}(a_{thr}^{min}-1)+1 \le a \le \text{Sca}(a_{thr}^{max}-1)+1 \qquad (6)$$

$$\text{Sca}(b_{thr}^{min}-1)+1 \le b \le \text{Sca}(b_{thr}^{max}-1)+1 \qquad (7)$$

In equations 6 and 7 above, $a_{thr}^{min}$ and $a_{thr}^{max}$ represent a complete range (e.g., all possible values for the variable are covered) of parameter a. Similarly, $b_{thr}^{min}$ and $b_{thr}^{max}$ represent a complete range of parameter b. The scale factor, Sca, may shrink the sweeping range for a and b and, as a result, the processing may be less data-driven. For example, when Sca=0 in equations 6 and 7 above, a and b will be equal to 1 and thus the processing may be regressed to be fully model-based processing.

As a result of the hybrid processing, estimates of formation body wave slowness and target wave dispersion may be output to a user or other downstream process (operation 612). In some examples, the formation body wave slowness and target wave dispersion may be provided directly to a user via a user interface and the like (not depicted). In other examples, the output may also or instead be saved in a log for later access and use (e.g., in analytic and/or modeling services).

Figure 7:
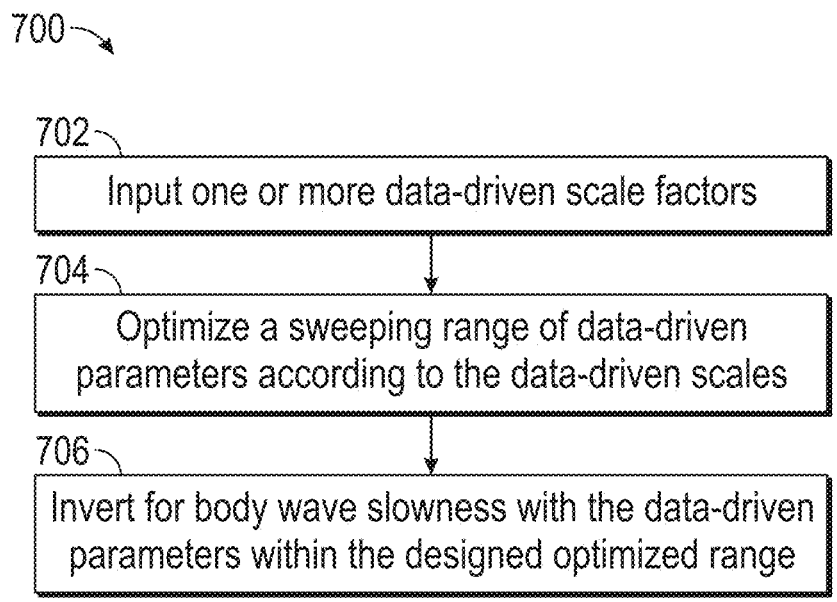
FIG. 7 is a method flowchart for performing hybrid processing, according to various embodiments of the subject technology.

FIG. 7 depicts a workflow 700 for performing a hybrid processing of dispersion curves. As discussed above in reference to FIG. 6, hybrid processing can use one or more scale factors to determine, for example, a body wave slowness from waveform data and the like through a combination of a data-driven and model-based processing.

Data-driven scale factors, such as those produced by a machine learning analysis as discussed above, can be provided as inputs (operation 702). Then, one or more sweeping ranges for adjustable parameters (e.g., a and b, discussed above) for data-driven processing can be generated and optimized (operation 704). In some examples, the adjustable parameters may be stretching parameters. In other examples, the adjustable parameters can be associated with an environmental mud slowness and the like. Furthermore, the hybrid processing may shift to fully model-based when the adjustable parameters are fixed values.

Finally, an inversion processing (e.g., to derive environmental conditions from features of the waveform data) can determine body wave slowness using the data-driven parameters and the sweeping ranges (operation 706) The inversion processing can, in some examples, aim to optimize a model to be as close as possible to the measurement while keeping the adjustable parameters in the calculated sweeping range. Nevertheless, a body wave slowness can be obtained as a final step.

Generally speaking, a data-driven scale may show a monotonous and nonlinear relationship with extracted features of dispersion measurements. For example, when the measured frequency length is too small, the scale factor tends to take into account more modeling parameter input. In comparison, the larger the measured frequency length, the implemented scale will be more data-driven during processing.

In another example, a measured and valid low frequency limit can be higher than an associated cut-off frequency (e.g., representing missing low frequency asymptote information). As a result, the data-driven scale factor may restrict the sweeping range of the data-driven parameters and so cause the processing to perform under a more model-based approach.

Figure 8:
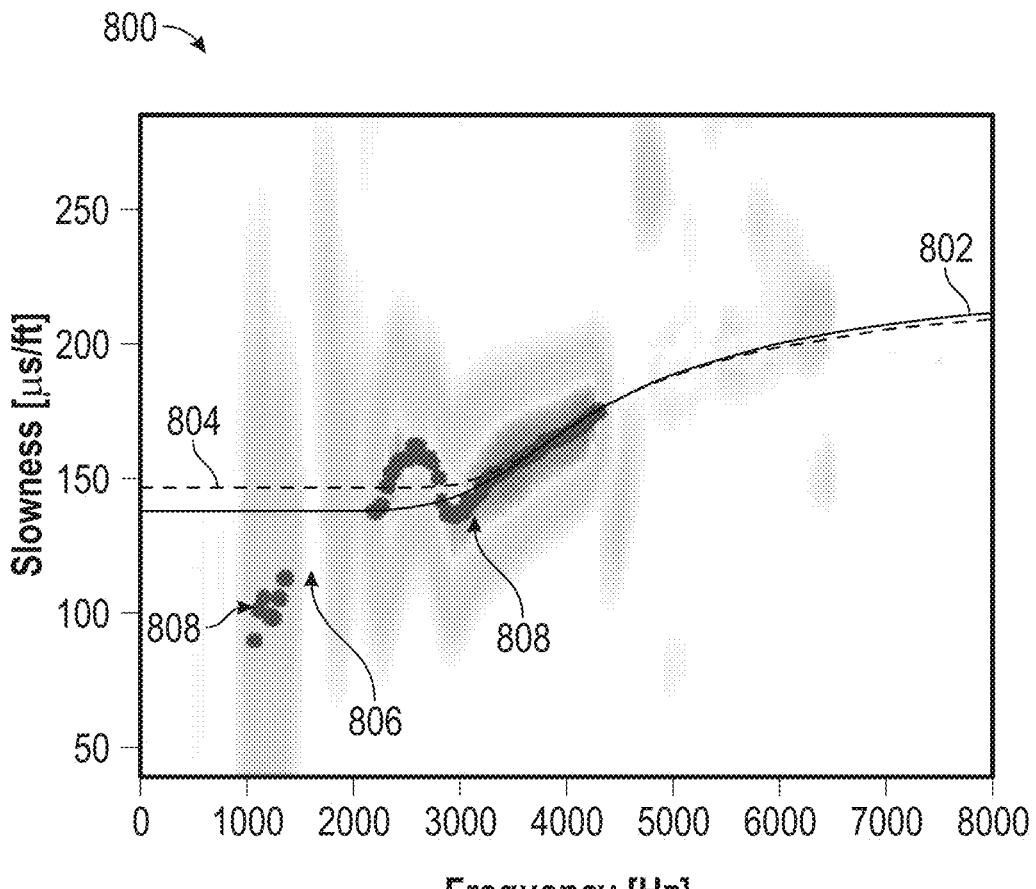
FIG. 8 is a graph of example dispersion curves, according to various embodiments of the subject technology.

Turning to FIG. 8, a scatterplot 800 displays the result of a dispersion curve fitting under both a fully data-driven process and an adaptive hybrid dispersion processing approach. As with FIG. 3, the measured data 808 is of low quality, including a measurement gap 806 and noisy data, as indicated by a scattered distribution of measurements.

Here, the fully data-driven process produces a fitting curve associated with a dashed line 804. In comparison, a curve produce by the hybrid processing produces a fitting curve associated with a smooth line 802. In this example, a scaling factor computed as 0.0553 produces the smooth line 802 curve by defining a small sweeping range (relative to a full sweeping range as would be found under the fully data-driven process). As a result, a model is used to greater effect in producing the dispersion curve and a better quality of low frequency asymptote of the measured dispersion curve can be produced.

Workflows 600 and 700 may be applied for every acquisition or at multiple depths within a borehole (e.g., the borehole 302). In some examples, the machine learning analysis can be performed across adjacent depths, or zones, in order to provide a more robust analysis of the borehole environment and the like. For example, in a washout zone (e.g., an enlarged borehole region caused by erosion and the like), there will likely be several bad depths in a row. The machine learning analysis can, by processing multiple depths, weight zones responsive to nearby zones rather than solely based on features at a single depth. Furthermore, updates to earlier performed solutions can be implemented based on new information from a data-driven scale (e.g., if later depths show the tool is actually in a low-quality data zone). Additionally, a log of the scale factors may be displayed to a user in order to inform the user of which depths are of what data quality as well as which depths are associated with partial or total model-based processing. In some aspects, this may inform a user of where borehole complexity is impacting (e.g., decreasing) data quality.

Figure 9:
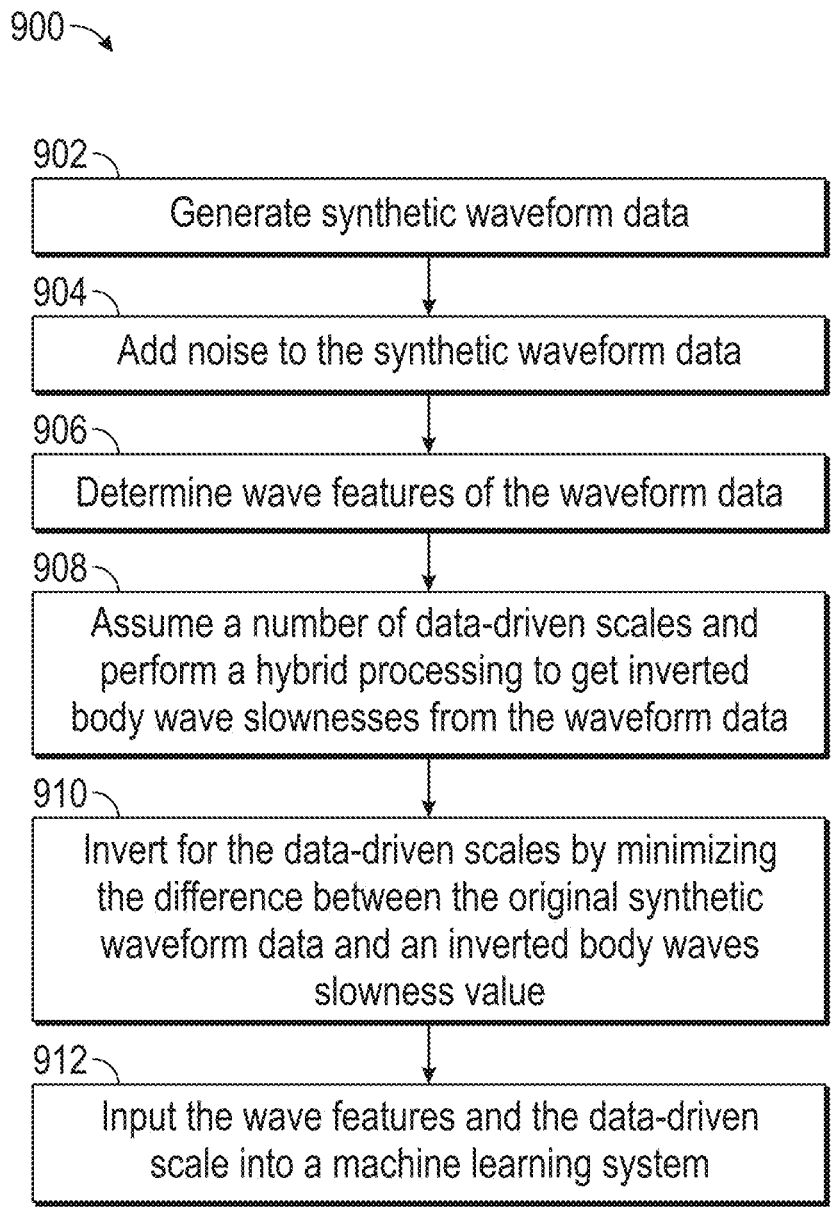
FIG. 9 is a method flowchart for training a machine learning analysis, according to various embodiments of the subject technology.

FIG. 9 depicts a training method 900 for the machine learning analysis discussed above. In some examples, training can take place prior to deploying the machine learning analysis. In some other examples, training takes place concurrent to deployment and the machine learning analysis may be updated using both synthetic training data and real data from the field.

Synthetic waveform data is first generated in order to train models used in the machine learning analysis (operation 902). The synthetic data may be for a number of different borehole models. In some examples, synthetic data may be shared by multiple borehole models.

Noise is then added to the synthetic waveform data in order to simulate waveform data collected from the field (operation 904). Copies of the synthetic waveform data without the added noise may be preserved in order to compare results against known (e.g., due to being generated) correct values.

The machine learning analysis may then extract wave features from the noisy synthetic waveform data (operation 906). A list of data-driven scales can be assumed (e.g., guessed) and used to perform one or more hybrid processes and inversion may be performed to derive body wave slownesses from the waveform data (operation 908). Each hybrid process may be associated with a respective data-driven scale value or values used for the process. Then the data-driven scale factor value that results in a hybrid process producing the most accurate body wave slowness result may be identified (e.g., by the association discussed above) by comparing outputs (e.g., body wave slowness) to the original synthetic waveform data used to produce the outputs and selecting the value with the smallest difference (e.g., error value) (operation 910).

Finally, the wave features and the selected data-driven scale factor value may be associated with each other and saved into a library (operation 912). The library can be accessed by the machine learning analysis and may be of various architectures. Further, it is generally preferred that, in synthesizing the waveform data, a tool model and borehole model which are as close to actual tools and boreholes are used in order to ensure the training method 900 can maximally capture features of the processing.

Figure 10:
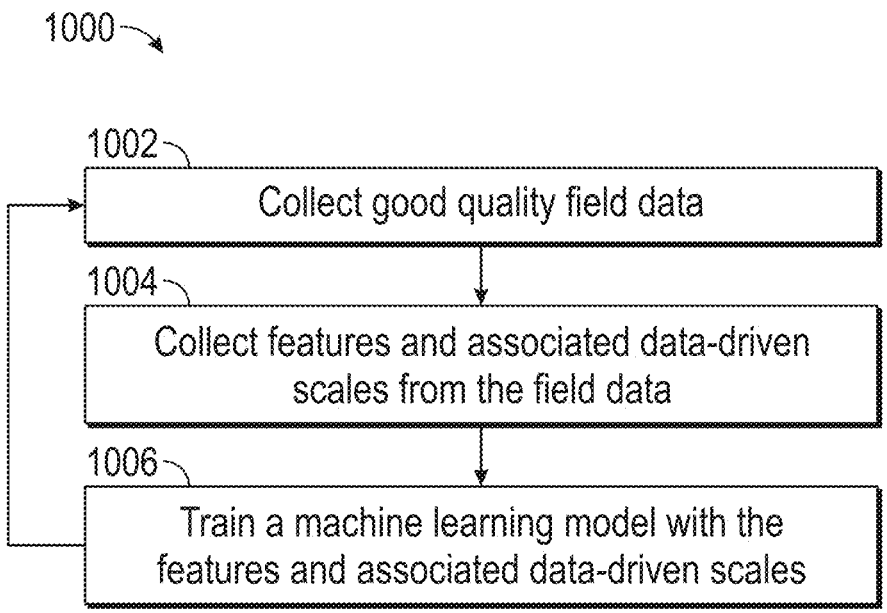
FIG. 10 is a method flowchart for training a machine learning analysis, according to various embodiments of the subject technology.

In addition to synthetic data, and as discussed above, field data can also be used as part of training datasets. FIG. 10 depicts a training method 1000 for the machine learning analysis which uses field data collected from the real world (e.g., from on-site logs of boreholes and the like).

Good quality data is first collected from the field (operation 1002). Well data from logs and the like may undergo a quality control process to ensure the data meets minimum threshold quality metrics. For example, logs may be checked for comprehensiveness (e.g., no monitoring gaps) or relating to a particular depth or depths in order to make it through quality control and be used for training the machine learning analysis. Furthermore, as more wells are drilled, the set of viable training data will continue to grow and provide more robust data coverage.

Similarly to the synthetic data methodology 900 discussed above, associated features and data-driven scales can be collected following, for example, hybrid processing at various data-driven scales until one is identified that is within some threshold proximity of a known value (e.g., exhibits the lower error value) (operation 1004). These collected values can then be used as, for example, exemplars for training a machine learning model (operation 1006). In some examples, such as where log collection and processing is automated, the training method 1000 can be automatically repeated as new data comes into the system.

Figure 11:
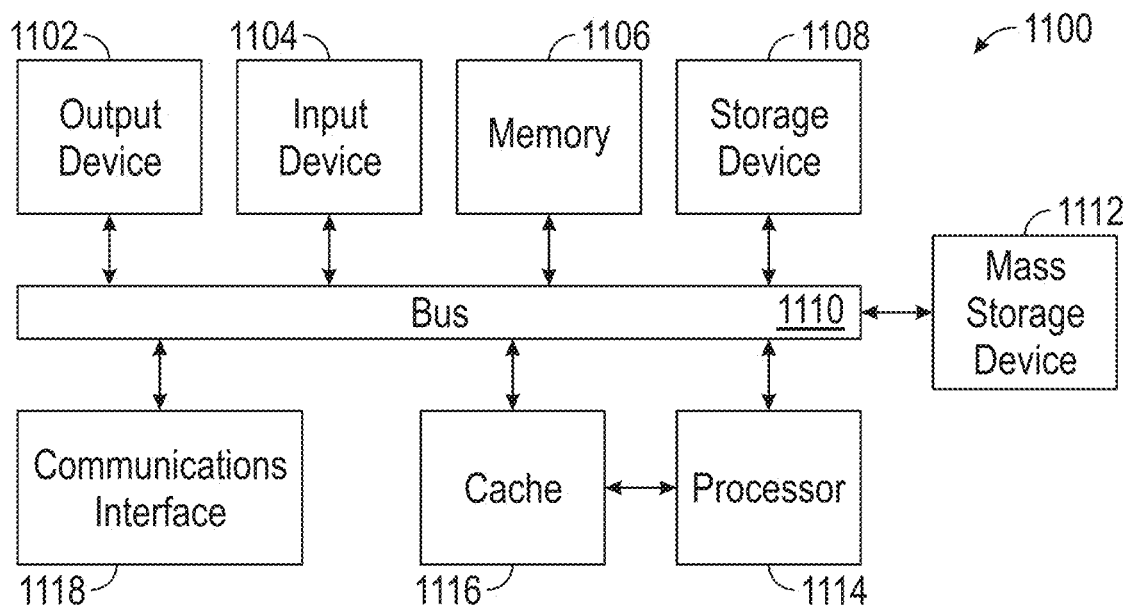
FIG. 11 is a schematic diagram of an example system which may be used in implementing various embodiments of the present disclosure.

FIG. 11 is a schematic diagram of a computing system 1100 that may implement various systems and methods discussed herein. The computing system 1100 includes one or more computing components in communication via a bus 1110. In one embodiment, the computing system 1100 may include one or more processor 1114. The processor 1114 can include one or more internal levels of cache 1116 and a bus controller or bus interface unit to direct interaction with the bus 1110. The processor 1114 can specifically implement the various methods discussed herein. Memory 1106 may include one or more memory cards and a control circuit, or other forms of removable memory, and can store various software applications including computer executable instructions, that when run on the processor 1114 implement the methods and systems set out herein. Other forms of memory, such as a storage device 1108 and a mass storage device 1112, can also be included and accessible by the processor (or processors) 1114 via the bus 1110. The storage device 1108 and mass storage device 1112 can each contain any or all of the methods and systems, in whole or in part, discussed herein. In some examples, the storage device 1108 or the mass storage device 1112 can provide a database or repository in order to store data as discussed below.

The computing system 1100 can further include a communications interface 1118 by way of which the computing system 1100 can connect to networks and receive data useful in executing the methods and systems set out herein as well as transmitting information to other devices. The computer system 1100 can also include an input device 1104 by which information is input. Input device 1104 can be a scanner, keyboard, and/or other input devices as will be apparent to a person of ordinary skill in the art. Similarly, the computer system 1100 can also include an output device 1102 which can be a monitor, data feed, application programming interface (API) hook, and other output devices and systems as will be apparent to a person of ordinary skill in the art. The system set forth in FIG. 1 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various examples of the disclosure or described with different terminology. These and other variations, modifications, additions, and improvements may fall within the scope of the disclosure as defined in the claims that follow.

What is claimed is:

1. A method for processing borehole wave modes, the method comprising:
    measuring, by an acoustic logging tool within a borehole passing through a formation, an acoustic wave to generate waveform data of an acoustic wave;
    determining wave features from the waveform data, wherein the wave features are associated with a quality of the waveform data;
    generating one or more data-driven scale factors by applying a trained model to the wave features, wherein the one or more data-driven scale factors adaptively balance a data-driven process and a model-based process based on the quality of the waveform data;
    determining data-driven scale parameters from different wave features by comparing wave features generated by the trained model to directly measured wave features;
    determining final parameters of the data-driven scale factor by combining the different wave features;
    generating a formation body wave slowness by performing a hybrid process based on the one or more data-driven scale factors, wherein the hybrid process is a combination of the data-driven process and the model-based process, such that the hybrid process is more reliant on the data-driven model when a larger measured frequency length is present;
    adjusting a downhole operational parameter based at least in part on the formation body wave slowness, wherein the downhole operational parameter comprises one of a drilling parameter, a logging parameter, a completion parameter, and a production parameter; and
    providing the formation body wave slowness to a user interface and/or saving the formation body wave slowness to a log, wherein the formation body wave slowness provides wellbore and/or formation characteristics throughout drilling.

2. The method of claim 1, further comprising: determining formation characteristics of a borehole environment; and modeling a fluid-filled borehole based on the determined formation characteristics of the borehole environment.

3. The method of claim 2, further comprising calculating one of a full waveform response of the modeled fluid-filled borehole environment, an Airy-phase frequency, and a cut-off frequency.

4. The method of claim 1, further comprising calculating one of a semblance value of target waves, an effective data length in frequency, and a minimum effective frequency.

5. The method of claim 1, further comprising: training a model with synthetic data to generate the trained model; and applying the trained model to field data.

6. The method of claim 5, further comprising: generating the synthetic data, wherein the synthetic data includes waveform data; adding noise to the generated synthetic data; determining wave features of the synthetic waveform data; determining data-driven scales by inverting the wave features of the synthetic waveform data; and training the model with the wave features of the synthetic waveform data and the data-driven scales.

7. The method of claim 1, further comprising: determining data-driven scale parameters from different wave features by comparing wave features generated by the model to directly measured wave features; and determining final parameters of the data-driven scale factor by combining the different wave features.

8. The method of claim 1, wherein the hybrid process comprises performing one of a fully modeling-based process, a fully data-driven process, and a limited data-driven process.

9. The method of claim 8, wherein the limited data-driven process comprises: generating a set of parameter ranges of the data-driven process from the one or more data-driven scale factors; and performing an inversion processing comprising limiting adjustable parameters in a fixed range.

10. The method of claim 1, further comprising generating a visualization of one of a waveform of the received acoustic wave, a time-domain semblance map, a misfit, and a fitting quality of the curve.

11. A system for processing borehole wave modes, the system comprising: a processor; and a memory comprising instructions which, when executed, cause the processor to:
    measure, by an acoustic logging tool within a borehole passing through a formation, an acoustic wave to generate waveform data of the acoustic wave;
    determine wave features from the waveform data, wherein the wave features are associated with a quality of the waveform data; generate one or more data-driven scale factors by applying a trained model to the wave features, wherein the one or more data-driven scale factors adaptively balance a data-driven process and a model-based process based on the quality of the waveform data;
    determine data-driven scale parameters from different wave features by comparing wave features generated by the trained model to directly measured wave features;
    determine final parameters of the data-driven scale factor by combining the different wave features;
    generate a formation body wave slowness by performing a hybrid process based on the one or more data driven-scale factors, wherein the hybrid process is a combination of the data-driven process and the model-based process, such that the hybrid process is more reliant on the data-driven model when a larger measured frequency length is present;
    adjusting a downhole operational parameter based at least in part on the formation body wave slowness, wherein the downhole operational parameter comprises one of a drilling parameter, a logging parameter, a completion parameter, and a production parameter; and
    providing the formation body wave slowness to a user interface and/or saving the formation body wave slowness to a log, wherein the formation body wave slowness provides wellbore and/or formation characteristics throughout drilling.

12. The system of claim 11, wherein the memory further comprises instructions which, when executed, cause the processor to: determine formation characteristics of a borehole environment; and model a fluid-filled borehole environment based on the borehole environment.

13. The system of claim 11, wherein the memory further comprises instructions which, when executed, cause the processor to: calculate one of a semblance value of target waves, an effective data length in frequency, a minimum effective frequency, a full waveform response of a modeled fluid-filled borehole environment, an Airy-phase frequency, and a cut-off frequency.

14. The system of claim 11, wherein the memory further comprises instructions which, when executed, cause the processor to: generate synthetic data including waveform data; add noise to the generated synthetic data; determine wave features of the synthetic waveform data; determine data-driven scales by inverting the wave features of the synthetic waveform data; train a model with the wave features of the synthetic waveform data and the data-driven scales to generate the trained model; and apply the trained model to field data.

15. The system of claim 11, wherein the memory further comprises instructions which, when executed, cause the processor to: determine data-driven scale parameters from different wave features by comparing wave features generated by the model to directly measured wave features; and determine final parameters of the data-driven scale factor by combining the different wave features.

16. The system of claim 11, wherein the hybrid process comprises performing one of a full modeling-based process, a fully data-driven process, and a limited data-driven process, and wherein the memory further comprises instructions which, when executed, cause the processor to: generate a set of parameter ranges of the data-driven processing from the one or more data-driven scale factors; and perform an inversion processing comprising limiting adjustable parameters in a fixed range.

* * * * *